July 16, 1946.  H. C. RIGGS ET AL  2,404,144
ACID-RELEASING MEANS FOR DEFERRED ACTION TYPE BATTERIES
Filed Oct. 29, 1943
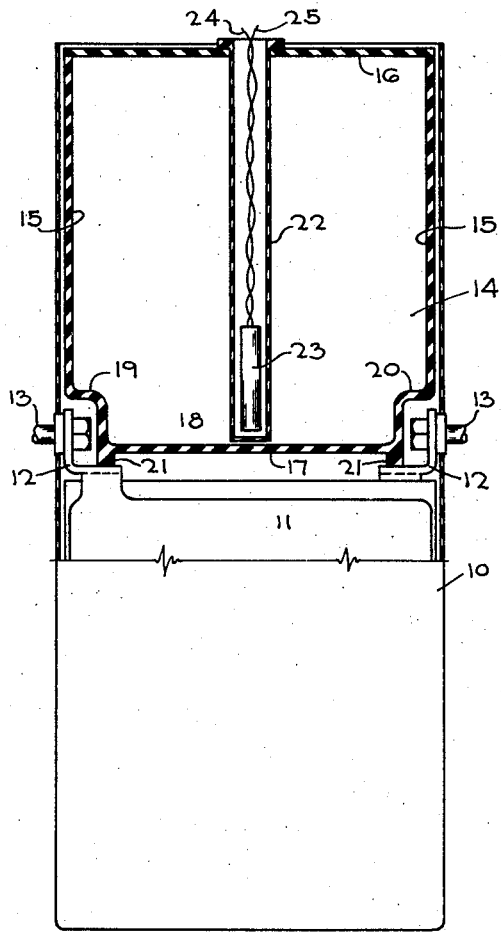
FIG. 1
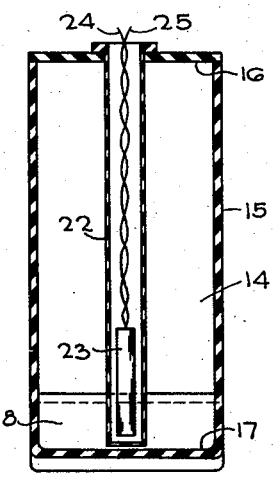
FIG. 2
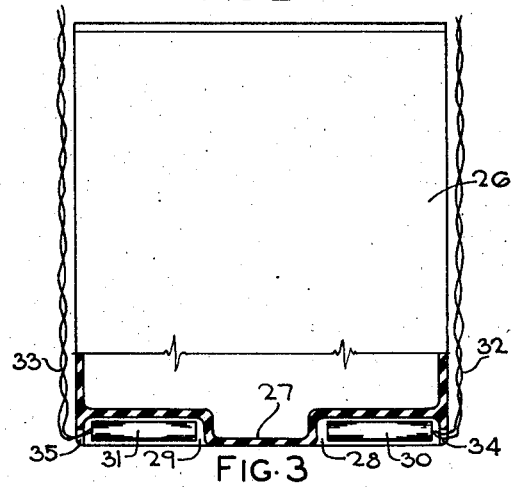
FIG. 3
FIG. 4
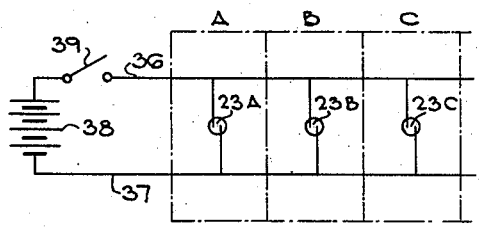
FIG. 5
INVENTORS:-
HAROLD COLEMAN RIGGS
WILLIAM WHARTON SMITH
BY
Augustus B. Stoughton
ATTORNEY Patented July 16, 1946

2,404,144

UNITED STATES PATENT OFFICE 2,404,144

ACID-RELEASING MEANS FOR DEFERRED ACTION TYPE BATTERIES

Harold Coleman Riggs, Langhorne Manor, and William Wharton Smith, Philadelphia, Pa., assignors to The Electric Storage Battery Company, a corporation of New Jersey Application October 29, 1943, Serial No. 508,238

5 Claims. (Cl. 136—90)

This invention relates to deferred action type batteries in which the electrolyte is maintained out of contact with the plates of the battery until the battery is called upon to supply power and has for its primary object the provision of means for releasing the electrolyte into the plate compartment quickly and effectively.

It is a further object of this invention to provide releasing means which are simple in construction, may be operated with the minimum expenditure of power, and which will cause the electrolyte to be released rapidly so that the battery will produce current substantially instantaneously after it is called upon for service.

It is a further object of this invention to provide new and improved releasing means which can be electrically operated and which are suitable for application either in individual cells or in a plurality of cells of a multiple cell battery.

In the usual deferred action type of battery there is provided an electrolyte compartment and a battery plate compartment. In accordance with this invention, the electrolyte compartment is positioned above the plate compartment and is separated therefrom by a frangible diaphragm. Positioned adjacent the diaphragm is one or more detonating squibs, the explosive force of which is directed against the diaphragm. These squibs when detonated cause the diaphragm to be broken away, permitting the electrolyte in the electrolyte compartment to run down into the plate compartment and the battery thereby to be placed in service. The detonating squibs are of the type that are fired electrically and means are provided for supplying the small amount of current necessary to fire these squibs.

Further objects and advantages of this invention will appear more fully as the following detailed description proceeds and the features of novelty which characterize this invention will be set forth in the claims appended to and forming a part of this specification.

For a more complete understanding of this invention, reference should be had to the accompanying drawing in which:

Figure 1 is a vertical elevation of a deferred action type of battery with portions broken away to show one form of the improved electrolyte releasing means of this invention;

Figure 2 is a side elevational elevation of the electrolyte compartment shown in Figure 1 showing further details of the acid releasing means;

Figure 3 is a vertical elevation, partly in section, showing a modified form of electrolyte compartment and acid releasing means for use in the deferred action type of battery shown in Figure 1;

Figure 4 is a bottom view of the electrolyte compartment shown in Figure 3; and

Figure 5 is a diagramamtic view of a preferred form of the circuit arrangement for the detonating squibs in the multiple unit battery, the individual cells being represented by dotted lines.

Referring to the drawing, and particularly Figures 1 and 2, 10 represents the outer container of a deferred action type of storage battery cell, the lower portion of which contains a battery assembly consisting of the usual positive and negative plate groups represented generally by the reference numeral 11. Extending upwardly from the positive and negative groups are straps 12 which are secured to terminal means 13 projecting outwardly through the side of the container. It is to be understood that the plate groups in the lower portion of the container 10 may be of either the primary or secondary type. With a primary type of battery, it is essential to maintain the electrolyte out of contact with the plates to prevent discharge of the battery or the destruction of the positive and negative plates. In a secondary battery it is frequently desirable to maintain the electrolyte out of contact with the plates in order to completely eliminate the gradual self-discharge of the battery due to the phenomena known as local action. Thus the acid releasing mechanism which forms the subject of the invention is applicable to either type of battery without limitation.

Positioned within the container 10 above the plate group 11 is an electrolyte compartment, which consists of a jar 14 having side walls 15, a top wall 16, and a bottom wall 17. The bottom wall is provided with a trough portion 18 which lies between and extends below the terminal posts 13 and is formed by offsetting the side walls 15 as at 19 and 20. Provided on opposite exterior edges of the trough portion 18 are depending feet members 21 which engage the straps 12 and thereby support the jar in the container 10 above the plate group 11. This electrolyte compartment or jar 14 may be made of any suitable, readily moldable, frangible material, such as hard rubber, glass or synthetic resin. Obviously the material must be of such a character that it will withstand attack by the type of electrolyte employed. In most types of cells this implies that the material employed must be acid-resistant.

Provided in the top wall of the acid compartment is an opening through which extends a tubular member 22, the lower end of which terminates adjacent the bottom wall 17 of the electrolyte compartment. As shown, the lower end of the tube 22 is closed. Positioned within this tubular member adjacent the lower end thereof is an explosive squib or cap 23.

Projecting from the cap or squib, upwardly through the tube 22, are electrical conductors 24 and 25 which are adapted to be connected to a suitable source of supply for firing the squibs. The upper portion of the tube 22 is hermetically sealed to the cover 16 of the electrolyte jar. The tubular member 22 is made of some suitable acid-resisting material and its principal function is to protect the squib 23 from attack by the acid maintained in the acid compartment. In order that the tube 22 may not prevent or inhibit functioning of the squib for the purpose intended, it is made of a relatively thin guage, acid-resisting material and, in the preferred form of this invention, it is made from thin sheets of polystyrene.

It will be observed that the squib 23 is positioned so as to lie adjacent the bottom wall 17 of the jar. If desired, this portion of the jar which constitutes a frangible diaphragm may be somewhat thinner than the remaining walls. However, this is not necessary if the explosive force of the squib is selected with reference to the thickness of the jar to be broken. In practice it has been found that with a wall of vinylite ⅛″ thick, a squib whose explosive charge is approximately 25% of the charge of a #6 blasting cap will satisfactorily shatter the bottom wall. The amount of charge will of course vary with the material used, its wall thickness and the area to be shattered. For example, with ³⁄₃₂″ rubber a squib having a charge of approximately 15% of a #6 blasting cap is sufficient.

In operation of the improved acid releasing arrangement, the jar 14 is filled with electrolyte to the desired level either through the opening provided for the tube 22 or through an alternative opening (not shown) which is subsequently sealed and the electrical leads 24 and 25 of the squib 23 are connected to a suitable source of power. When it is desired to place the battery in service, the circuit to the source of power is closed, thus causing firing of the squibs. Due to the construction of trough 18 and the fact that an incompressible layer of liquid of substantial depth lies above the squib, its explosive force will be concentrated downwardly causing the retaining tube 22 to be shattered and also the trough portion of the electrolyte jar between the ledges 19 and 20. The electrolyte in the jar will thereby be released into the plate compartment of the battery.

In Figures 3 and 4 there is shown a modified form of electrolyte jar 26 suitable for use with detonating squibs. In this form of the invention, the bottom wall 27 of the jar is provided with exterior recesses 28 and 29 which are adapted to receive a pair of detonating squibs 30 and 31. The squibs 30 and 31 are held in the respective recesses by means of a suitable cement (not shown) and extending from each squib are leads 32 and 33. In order to accommodate these leads, the wall of the recesses 28 and 29 is slotted as shown at 34 and 35.

With this arrangement the explosive force of the squibs is concentrated against the bottom of the jar and causes it to be ruptured inwardly. As will be more fully pointed out hereinafter, the squibs are electrically connected in parallel and each squib is selected so that it alone will break the bottom of the electrolyte jar. Thus a factor of safety is provided in the event one of the squibs should turn out to be a dud. As was said with reference to the jar illustrated in Figure 2, the jar shown in Figure 3 may be molded from either hard rubber, glass or a synthetic resin.

In Figure 5 there is indicated the squib circuit for a multiple unit battery having the new and improved acid-releasing construction of this invention incorporated therein. The battery consists of a plurality of cells, A, B and C, each having the construction shown in Figure 1. This is shown schematically by the dotted lines. Provided in each cell is a detonating squib and all of the individual squibs 23A, 23B, 23C in the entire assembly are connected in parallel to a firing circuit 36—37 which is energized from a suitable source of power 38 for firing the entire group of squibs. This source of power may consist of a group of dry cells having a capacity sufficient to cause the firing of all of the squibs. Connected in the firing circuit is a manually or automatically operable switch 39.

When it is desired to place the entire battery in service, the switch 39 is closed and all of the squibs are fired simultaneously, thereby causing the simultaneous releasing of the electrolyte in each of the individual cells. The multiple unit battery thus produces substantially instantaneously its maximum power output, assuming that it is connected to a closed circuit containing translating devices requiring power.

From the foregoing description it will be observed that there is provided relatively simple means for effectively and substantially instantaneously causing the electrolyte in the electrolyte compartment of a deferred action type of battery to be released into the plate compartment when the battery is to be put into service. Moreover, it will be observed that there is provided an improved arrangement by which the releasing of electrolyte can be effected with a minimum of expenditure of power in either a single cell unit or a multiple cell unit and a system which, when applied to a multiple cell unit, permits the simultaneous releasing of all units. Moreover, it will be observed that there is provided an electrolyte releasing system in which the power for actually producing the releasing is stored in an explosive squib, thereby reducing to a minimum the weight and complications of such acid-releasing mechanism.

While there has been described modifications of this invention, it is not intended to be limited thereto as other modifications will no doubt occur to those skilled in the art. For example, the general design features of the battery container could be modified to eliminate the overall container. It is therefore intended in the appended claims to cover all modifications which come within the true spirit and scope of this invention.

We claim:

1. In a deferred action type of battery, a plate compartment, an electrolyte compartment, a partition for separating said electrolyte compartment from said plate compartment until said battery is to be placed in service and explosive squib means located adjacent said partition for rupturing a portion of said partition when it is desired to place said battery in service.

2. In a deferred action type of battery having a plate compartment and an acid compartment separated by a frangible diaphragm, means comprising detonating squibs for rupturing said frangible diaphragm to permit electrolyte stored in said electrolyte compartment to be discharged into said plate compartment, and means for supporting said detonating squibs adjacent said frangible diaphragm to concentrate the explosive force of said squibs.

3. In a deferred action type of battery, a plurality of individual cells containing battery elements in the lower portion thereof and electrically connected in series, an electrolyte compartment in the top portion of each of said cells above said battery elements and provided with a frangible bottom wall for maintaining the electrolyte above and out of contact with the battery elements until said battery is put into service and detonating squib means located adjacent said bottom wall in each cell for simultaneously rupturing said frangible walls when said battery is to be placed into service.

4. In a deferred action type of battery, a plate compartment containing battery elements, an electrolyte container supported above said plate compartment and having a top wall, bottom wall and side walls, said top wall being provided with an opening therethrough, a tubular member projecting through said opening and terminating adjacent said bottom wall, a detonating squib positioned in said tubular member adjacent the lower end thereof, and electrical conductors extending upwardly from said squib and outwardly through said top wall adapted to be connected to a source of power for firing said squib.

5. In a deferred action type of battery having a plate compartment and an electrolyte compartment located above and normally separated from said plate compartment, means for connecting said compartments when said battery is to be put in service comprising an electrolyte jar positioned within said electrolyte compartment and having a bottom wall, a pair of recesses in the bottom wall of said jar and opening exteriorly to said jar, detonating squibs positioned within said recesses, and means for connecting said squibs to an electrical circuit.

HAROLD COLEMAN RIGGS.
WILLIAM WHARTON SMITH.